US012501974B2

(12) United States Patent
Tan

(10) Patent No.: US 12,501,974 B2
(45) Date of Patent: Dec. 23, 2025

(54) FOLDABLE TACKLE BAG

(71) Applicant: Thousand Oaks Corp., Irwindale, CA (US)

(72) Inventor: Roger Tan, Chino, CA (US)

(*) Notice: Subject to any disclaimer, the term of this patent is extended or adjusted under 35 U.S.C. 154(b) by 1447 days.

(21) Appl. No.: 16/925,231

(22) Filed: Jul. 9, 2020

(65) Prior Publication Data

US 2021/0007452 A1  Jan. 14, 2021

Related U.S. Application Data

(63) Continuation-in-part of application No. 29/697,580, filed on Jul. 10, 2019, now Pat. No. Des. 947,524, and
(Continued)

(51) Int. Cl.
*A45C 7/00* (2006.01)
*A45F 3/04* (2006.01)
(Continued)

(52) U.S. Cl.
CPC ............ *A45C 7/0095* (2013.01); *A45F 3/047* (2013.01); *A45F 3/14* (2013.01); *A01K 97/06* (2013.01);
(Continued)

(58) Field of Classification Search
CPC . A45C 7/0095; A45C 2003/008; A45F 3/007; A45F 3/04; A45F 2003/14; A45F 3/047; A45F 3/14; A45F 2003/142
(Continued)

(56) References Cited

U.S. PATENT DOCUMENTS 258,393 A    5/1882  Endicott
1,482,678 A  2/1924  Figley
(Continued)

FOREIGN PATENT DOCUMENTS

CN    101066048 A    11/2007
CN    101088330 A    12/2007
(Continued)

OTHER PUBLICATIONS

Flambeau 5007 Pro-Angler Tackle Bag (Grey/Red), first available Apr. 23, 2020, arnazon.com [online], [site visited Nov. 24, 2020], w Available from internet U RL: https://www.arnazon .com/Fiarnbeau-5007 -Pro-Angler-Tackle-Grey/dp/B089458PL7 /ref=sr _1_22? dchild=1&gclid=EAiaiQobCh M 10uut0b6b 7QIVCDiGC% E2%80% A6 (Year: 2020).
(Continued)

*Primary Examiner* — Sue A Weaver
(74) *Attorney, Agent, or Firm* — J. Andrew Reed; Think Differently Legal, PLLC

(57) ABSTRACT

A portable storage device having a foldable storage compartment. The portable device having a main storage compartment defined by a front wall, a rear wall, a first side wall, a second side wall, and a bottom wall, with each of said walls can be coupled together. The portable device further having a top portion that is coupled to one or more of the walls and capable of covering an opening defined by the main storage compartment, wherein the top portion has at least one securing mechanism to couple to a counterpart securing mechanism on the outer side of the wall opposing the wall that the top portion is coupled to. The main storage compartment of the portable device can be shaped to house at least one folding storage compartment. A system including a storage tray that is sized and configured to fit within the portable device.

8 Claims, 10 Drawing Sheets

Related U.S. Application Data a continuation-in-part of application No. 29/697,577, filed on Jul. 10, 2019, now Pat. No. Des. 939,209.

(60) Provisional application No. 62/872,249, filed on Jul. 10, 2019, provisional application No. 62/872,247, filed on Jul. 10, 2019, provisional application No. 62/872,243, filed on Jul. 9, 2019.

(51) Int. Cl.
 A45F 3/14 (2006.01)
 A01K 97/06 (2006.01)
 A45C 3/00 (2006.01)

(52) U.S. Cl.
 CPC ... *A45C 2003/008* (2013.01); *A45F 2003/142* (2013.01)

(58) Field of Classification Search
 USPC .......................................................... 150/113
 See application file for complete search history.

(56) References Cited

U.S. PATENT DOCUMENTS

| | | |
|---|---|---|
| 1,791,346 A | 2/1931 | Burch et al. |
| 2,028,339 A | 1/1936 | Abraham et al. |
| 2,102,977 A | 12/1937 | Shoemaker et al. |
| 2,316,833 A | 4/1943 | Baron |
| 2,554,668 A | 5/1951 | Charles |
| 2,595,463 A | 5/1952 | Kamps |
| 2,616,209 A | 11/1952 | Ploen |
| 2,717,470 A | 9/1955 | Holdeman |
| 2,730,833 A | 1/1956 | Newell |
| 2,956,365 A | 10/1960 | Smith et al. |
| 2,987,846 A | 6/1961 | Powell |
| 3,047,349 A | 7/1962 | Powell |
| 3,122,225 A | 2/1964 | Ward |
| 3,181,751 A | 5/1965 | Jean |
| RE25,826 E | 8/1965 | Ward |
| 3,310,271 A | 3/1967 | King |
| 3,481,066 A | 12/1969 | Woolworth |
| 3,564,755 A | 2/1971 | Lindgren, Sr. |
| 3,813,138 A | 5/1974 | Doohan |
| 3,850,396 A | 11/1974 | Orlandi |
| 3,985,409 A | 10/1976 | Kneier |
| 4,023,304 A | 5/1977 | Singer |
| 4,151,938 A | 5/1979 | Barker et al. |
| 4,169,550 A * | 10/1979 | Williams ................ A61F 17/00 224/644 |
| 4,176,491 A | 12/1979 | Herring |
| D257,651 S | 12/1980 | Katz et al. |
| 4,240,222 A | 12/1980 | Covington |
| 4,245,422 A | 1/1981 | Souza |
| 4,324,446 A | 4/1982 | LeSage |
| D280,260 S | 8/1985 | Leiserson |
| D284,333 S | 6/1986 | Huston |
| D284,620 S | 7/1986 | Calton |
| D291,149 S | 8/1987 | Smith |
| 4,739,886 A | 4/1988 | Seaberg |
| 4,769,941 A | 9/1988 | Schmidt |
| D299,587 S | 1/1989 | Thomas |
| 4,811,996 A | 3/1989 | Hansson |
| 4,854,432 A | 8/1989 | Carpenter et al. |
| 4,958,730 A | 9/1990 | Bunten |
| D311,452 S | 10/1990 | Ehret |
| D312,530 S | 12/1990 | Gallen et al. |
| 5,054,669 A | 10/1991 | Zimbardi et al. |
| 5,087,105 A | 2/1992 | White |
| D333,038 S | 2/1993 | Collins |
| D336,218 S | 6/1993 | Hague |
| D341,026 S | 11/1993 | Barker |
| 5,261,529 A | 11/1993 | Holland |
| D347,521 S | 6/1994 | Elliott |
| D349,191 S | 8/1994 | Mason |
| D352,827 S | 11/1994 | Schildkraut |
| 5,386,662 A | 2/1995 | Vader et al. |
| D360,182 S | 7/1995 | Lovett |
| 5,454,477 A | 10/1995 | Bomhorst et al. |
| 5,505,297 A | 4/1996 | Myers |
| D371,051 S | 6/1996 | Melk |
| D371,052 S | 6/1996 | Melk |
| 5,526,907 A | 6/1996 | Trawick |
| 5,526,927 A | 6/1996 | McLemore |
| D371,724 S | 7/1996 | Melk |
| 5,556,068 A | 9/1996 | Gorelik |
| D376,044 S | 12/1996 | Trawick et al. |
| 5,606,820 A | 3/1997 | Suddeth |
| 5,630,537 A | 5/1997 | Sciacca |
| D381,871 S | 8/1997 | Melk |
| D382,108 S | 8/1997 | Wheeler |
| D383,601 S | 9/1997 | Jones et al. |
| 5,676,223 A | 10/1997 | Cunningham |
| D387,626 S | 12/1997 | Melk |
| D389,305 S | 1/1998 | Hauschild |
| D394,552 S | 5/1998 | Melk |
| 5,769,260 A | 6/1998 | Killinger et al. |
| 5,772,066 A | 6/1998 | Reynolds |
| D396,745 S | 8/1998 | Peterson |
| D398,083 S | 9/1998 | Martz |
| D401,062 S | 11/1998 | Hauschild |
| 5,829,185 A | 11/1998 | Myers |
| 5,908,147 A | 6/1999 | Chuang |
| D412,269 S | 7/1999 | Wyant |
| D414,932 S | 10/1999 | Platte, III |
| D416,680 S | 11/1999 | Latshaw |
| D423,779 S | 5/2000 | Goatcher |
| D427,768 S | 7/2000 | Bogert |
| D435,343 S | 12/2000 | Eskandry |
| 6,202,865 B1 | 3/2001 | Kuo |
| 6,202,910 B1 | 3/2001 | Swetish |
| 6,290,040 B1 | 9/2001 | Chen |
| 6,321,912 B1 | 11/2001 | Lippert et al. |
| D452,806 S | 1/2002 | King |
| 6,454,097 B1 | 9/2002 | Blanco |
| D465,086 S | 11/2002 | Watts |
| D465,134 S | 11/2002 | Joss |
| D468,101 S | 1/2003 | Hassett |
| D469,606 S | 2/2003 | Su |
| D471,012 S | 3/2003 | Peterson |
| 6,530,475 B1 | 3/2003 | Penney |
| D472,380 S | 4/2003 | Hillman |
| D472,386 S | 4/2003 | Bauer |
| D474,598 S | 5/2003 | Platte, III |
| D476,480 S | 7/2003 | Hillman |
| 6,595,604 B1 | 7/2003 | Peterson |
| 6,612,434 B1 * | 9/2003 | Redzisz ................ A01K 97/06 206/315.11 |
| D481,204 S | 10/2003 | Rada |
| D482,525 S | 11/2003 | Fair |
| D482,842 S | 12/2003 | Fair |
| D484,695 S | 1/2004 | DePalma |
| D485,144 S | 1/2004 | Levine et al. |
| D487,189 S | 3/2004 | Ukitsu et al. |
| D487,191 S | 3/2004 | Ong |
| D492,160 S | 6/2004 | Lanman et al. |
| 6,742,636 B2 | 6/2004 | Godshaw |
| D495,489 S | 9/2004 | Messina-Brown |
| 6,821,019 B2 | 11/2004 | Mogil |
| D504,229 S | 4/2005 | Duvigneau |
| D506,061 S | 6/2005 | McGibben |
| D507,734 S | 7/2005 | Willems |
| 6,926,136 B1 | 8/2005 | Lynch-Bass |
| D514,317 S | 2/2006 | Conforti |
| D528,295 S | 9/2006 | Harvey |
| D530,089 S | 10/2006 | Silverman |
| 7,162,890 B2 | 1/2007 | Mogil et al. |
| D542,031 S | 5/2007 | Zapata |
| D542,527 S | 5/2007 | Zapata |
| 7,240,513 B1 | 7/2007 | Conforti |
| D552,350 S | 10/2007 | Bosley |
| D556,452 S | 12/2007 | Hydon |
| D560,450 S | 1/2008 | Tagliati et al. |
| D566,393 S | 4/2008 | Kidakarn |
| D574,615 S | 8/2008 | Picot et al. |

(56) References Cited

U.S. PATENT DOCUMENTS

| | | |
|---|---|---|
| 7,568,566 B2 | 8/2009 | D'Ambrosio |
| 7,604,103 B2 | 10/2009 | Hamlin |
| D603,169 S | 11/2009 | Smith |
| 7,621,074 B2 | 11/2009 | Glidewell et al. |
| D620,254 S | 7/2010 | Noraker |
| 7,837,032 B2 | 11/2010 | Smeltzer |
| D634,543 S | 3/2011 | Scicluna et al. |
| D634,601 S | 3/2011 | Good |
| 7,937,884 B1 | 5/2011 | Naylor et al. |
| 7,941,965 B2 | 5/2011 | Hoover |
| D639,051 S | 6/2011 | Dare |
| D647,301 S | 10/2011 | Sosnovsky |
| 8,043,004 B2 * | 10/2011 | Mogil ............... A45C 5/02 220/592.2 |
| D648,533 S | 11/2011 | Sosnovsky |
| D660,589 S | 5/2012 | Ayjian |
| 8,348,510 B2 * | 1/2013 | Mogil ............... B65D 81/38 383/110 |
| D676,652 S | 2/2013 | Holloway et al. |
| 8,453,813 B2 | 6/2013 | Lai |
| D692,661 S | 11/2013 | Gupton |
| 8,621,720 B2 | 1/2014 | Kao et al. |
| D714,541 S | 10/2014 | Anderson et al. |
| D720,216 S | 12/2014 | Luburic et al. |
| 8,899,071 B2 | 12/2014 | Mogil |
| D724,318 S | 3/2015 | Myer |
| D725,908 S | 4/2015 | Zwetzig |
| 9,144,281 B2 | 9/2015 | Cross |
| D742,637 S | 11/2015 | Miles |
| 9,226,557 B2 * | 1/2016 | Sullivan ............... A45C 13/02 |
| D761,564 S | 7/2016 | Rhodes |
| D762,384 S | 8/2016 | Boroski |
| D762,978 S | 8/2016 | Boroski |
| 9,462,874 B1 | 10/2016 | Samuel |
| D779,824 S | 2/2017 | Boroski |
| D781,575 S | 3/2017 | Etekochay |
| D787,816 S | 5/2017 | Slimane |
| D793,728 S | 8/2017 | Faibish et al. |
| D796,188 S | 9/2017 | Ho et al. |
| 9,854,897 B1 | 1/2018 | Pelkey, Jr. et al. |
| D818,204 S | 5/2018 | Renforth |
| D821,097 S | 6/2018 | Burton et al. |
| D824,170 S | 7/2018 | Tobias |
| D828,112 S | 9/2018 | Furneaux |
| D831,952 S | 10/2018 | Pennington |
| D832,653 S | 11/2018 | Waskow et al. |
| D833,141 S | 11/2018 | Carter et al. |
| D835,473 S | 12/2018 | Jacobsen |
| D835,950 S | 12/2018 | Jacobsen |
| D836,999 S | 1/2019 | Jacobsen |
| D837,000 S | 1/2019 | Jacobsen |
| D837,001 S | 1/2019 | Jacobsen |
| D838,971 S | 1/2019 | Deanda |
| D844,324 S | 4/2019 | Hoppe et al. |
| D845,613 S | 4/2019 | Decker |
| D856,662 S | 8/2019 | Breines |
| D862,528 S | 10/2019 | Sullivan et al. |
| 10,477,991 B1 | 11/2019 | Fragala |
| D873,090 S | 1/2020 | Jacobsen |
| D874,129 S | 2/2020 | Goldstein |
| D875,385 S | 2/2020 | Carter et al. |
| D880,253 S | 4/2020 | Jacobsen |
| D881,655 S | 4/2020 | Jacobsen |
| D887,135 S | 6/2020 | Tan |
| D887,136 S | 6/2020 | Tan |
| D893,183 S | 8/2020 | Eisenhardt et al. |
| D896,504 S | 9/2020 | Li |
| D896,505 S | 9/2020 | Yuan |
| D896,514 S | 9/2020 | Tan |
| D898,349 S | 10/2020 | He |
| D901,882 S | 11/2020 | Tan |
| 10,881,178 B2 | 1/2021 | Johnson |
| D912,974 S | 3/2021 | Breines |
| D915,762 S | 4/2021 | Li |
| D915,770 S | 4/2021 | Breines |
| D919,287 S | 5/2021 | He |
| D920,744 S | 6/2021 | Eisenhardt et al. |
| D922,061 S | 6/2021 | Tan |
| D922,062 S | 6/2021 | Shi |
| D927,174 S | 8/2021 | Dai |
| D927,261 S | 8/2021 | Rong |
| 11,076,666 B2 | 8/2021 | Sullivan et al. |
| D931,600 S | 9/2021 | Huang |
| D932,179 S | 10/2021 | Mukri |
| D938,717 S | 12/2021 | Tan |
| D941,578 S | 1/2022 | Fernandes |
| 11,242,189 B2 | 2/2022 | Rogers |
| D947,524 S | 4/2022 | Tan |
| D964,123 S | 9/2022 | Peng |
| D979,244 S | 2/2023 | Luo |
| D984,119 S | 4/2023 | De Abreu |
| 11,673,344 B2 | 6/2023 | Chen |
| 2001/0042665 A1 | 11/2001 | Siwak |
| 2002/0181806 A1 | 12/2002 | Godshaw et al. |
| 2004/0065573 A1 | 4/2004 | Brouard |
| 2004/0149600 A1 | 8/2004 | Wolter et al. |
| 2005/0016648 A1 | 1/2005 | Vakharia et al. |
| 2005/0077135 A1 | 4/2005 | Drew et al. |
| 2005/0082132 A1 | 4/2005 | Smith |
| 2005/0121275 A1 | 6/2005 | Platte |
| 2005/0161483 A1 | 7/2005 | Krohn |
| 2005/0263364 A1 | 12/2005 | Sher |
| 2005/0279124 A1 | 12/2005 | Maldonado |
| 2006/0064852 A1 | 3/2006 | Willems |
| 2007/0011939 A1 | 1/2007 | Sakai |
| 2007/0214613 A1 | 9/2007 | Shiao |
| 2007/0228097 A1 | 10/2007 | Recanati |
| 2007/0237432 A1 | 10/2007 | Mogil |
| 2007/0245521 A1 | 10/2007 | Chehebar |
| 2008/0029666 A1 | 2/2008 | Hurt |
| 2008/0121554 A1 | 5/2008 | Townsend |
| 2008/0164265 A1 | 7/2008 | Conforti |
| 2008/0289925 A1 | 11/2008 | Sapyta |
| 2012/0043228 A1 | 2/2012 | Ezzo et al. |
| 2012/0286011 A1 | 11/2012 | Wegener |
| 2013/0043293 A1 | 2/2013 | Connell |
| 2013/0068776 A1 | 3/2013 | Patterson |
| 2013/0145581 A1 | 6/2013 | Bailey |
| 2014/0132131 A1 | 5/2014 | Thomas |
| 2014/0290025 A1 | 10/2014 | Custer |
| 2014/0360831 A1 * | 12/2014 | Kao ............... A45C 13/03 190/108 |
| 2015/0014108 A1 | 1/2015 | Vecellio |
| 2015/0101958 A1 | 4/2015 | Cross |
| 2016/0205913 A1 | 7/2016 | Aston et al. |
| 2016/0244239 A1 | 8/2016 | Nash |
| 2016/0374440 A1 | 12/2016 | Lundy et al. |
| 2017/0073146 A1 | 3/2017 | Kuhn et al. |
| 2018/0220759 A1 | 8/2018 | Johnson |
| 2018/0343995 A1 | 12/2018 | Dingler et al. |
| 2020/0205537 A1 * | 7/2020 | Franco ............... A45C 3/06 |
| 2021/0007451 A1 | 1/2021 | Tan |
| 2021/0007452 A1 | 1/2021 | Tan |
| 2021/0068510 A1 | 3/2021 | Johnson |
| 2021/0212442 A1 | 7/2021 | Webb |
| 2021/0368955 A1 | 12/2021 | Fernandes |
| 2023/0027563 A1 | 1/2023 | Fadal et al. |
| 2023/0232952 A1 | 7/2023 | Zucco |

FOREIGN PATENT DOCUMENTS

| | | |
|---|---|---|
| CN | 201360487 | 12/2009 |
| CN | 102972367 A | 3/2013 |
| CN | 205357836 U | 7/2016 |
| CN | 305294327 | 8/2019 |
| EP | 0071274 A2 | 2/1983 |
| GB | 6119047 | 2/2021 |
| JP | H07241210 A | 9/1995 |

(56) References Cited

FOREIGN PATENT DOCUMENTS

| | | |
|---|---|---|
| JP | D1128650 | 12/2001 |
| JP | D1173649 | 5/2003 |

OTHER PUBLICATIONS

Flambeau Heritage 4007 Tackle Bag, unknown first available date, DicksSportingGoods.com [online], [site visited Nov. 24, 2020], Available from internet URL: https://www.dickssportinggoods.com/p/flambeau-heritage-4007-tackle-bag-20fmbaflmbhrtg3 70tbx/20fmbaflmbhrtg370tbx?sku=21521402&camp=CSE:%E2%80%A6 (Year: 2020).
KastKing Fishing Tackle Bags, first available Jun. 27, 2018, amazon.com [online], [site visited Nov. 14, 2018], Available from internet URL: https: l/www.amazon.com/d p/BO7F2HV28F/ref=sspa_dk_ detail_6?pd_rd_i=BO7XRFSFPN&pd_rd_w=a6HTH&pf_rd_p7d37a48b-2b1a-4373-8c1a-bd%E2%80%A6 (Year: 2018).
Okuma Fishing Tackle Soft Sided Tackle Bag, first available Oct. 23, 2015, amazon.com [online], [site visited Nov. 24, 2020], Available from internet URL: https://www.arnazon.com/Okurna-Fishing-Tackle-Soft-Sided/dp/8018M56S28 (Year. 2015).
Evolution Outdoor Drift Series Topless Horizontal Tackle Bag, first available Feb. 24, 2021, amazon.com [online], [site visited Jun. 28, 2021], Available at internet URL: https://www.amazon.com/Evolution-Outdoor-Topless-Horizontal-Tackle/dp/B08WRNXBXV?th=1&psc=1 (Year: 2021).
Evolution Outdoor Drift Series Topless Vertical Tackle Bag, first available Mar. 2, 2021, amazon.com [online], [site visited Jun. 28, 2021], Available at internet URL: https://www.amazon.com/Evolution-Outdoor-Topless-Vertical-Tackle/dp/B08WRVCF31?th=1 (Year: 2021).
KastKing Fishing Tackle Bag, first available Jun. 27, 2018, amazon.com [online], [site visited Jun. 28, 2021], Available at internet URL: https://www.amazon.com/KastKing-Saltwater-Waterproof-Medium-Hoss-15x11x10-25/dp/B07XRFSFPN/ref=pd_lpo_3?pd_rd_i=B07F2GH9VS&psc=1 (Year: 2018).
Plano Guide Series Tackle Bag, first available Feb. 10, 2020, amazon.com [online], [site visited Jun. 28, 2021], Available at internet URL: https://www.amazon.com/Piano-Premium-Storage-included-PLABG371/dp/B084NQLFMH/ref=pd_lpo_2?pd_rd_i=B084NQLFMH&psc=1 (Year: 2020).
Evolution fishing drift series tackle backpack, posted at amazon.com, first available Feb. 23, 2022, retrieved on Jun. 6, 2023, online, https://www.amazon.com/Evolution-Fishing-Drift-Tackle-Backpack/dp/B09T5W2TXF (Year: 2022).
Igogi fishing tackle backpack, posted at amazon.com, first available Jul. 8, 2021, retrieved on Jun. 6, 2023, online, https://www.amazon.com/IGOGI-Fishi ng-Backpack-Holders-Without/dp/B098WPZY25 (Year: 2021).
Piscifun fishing tackle backpack, posted at amazon.com, first available Apr. 16, 2018, retrieved on Jun. 6, 2023, online, https://www.amazon.com/Piscifun-Backpack-Capacity-Waterproof-Protective/dp/B07C7R9696 (Year: 2018).
Amazon, "Flambeau 4007 Heritage Tackle Bag, Fir Green/Pewter/Rust, FL40001", First on sale Apr. 23, 2020. (https://www.amazon.com/Fiambeau-Heritage-Bait-Binder/dp/B089469PPT) (Year: 2020).
Amazon, "Piscifun Fishing Tackle Backpack with 4 Trays Large Waterproof Tackle Bag Storage . . . ", (https://www.amazon.com/Piscifun-Backpack-Capacity-Waterproof-Protective/dp/B07CGJ DTN GI} (Year: 20 18), 13 pgs.
International Search Report and Written Opinion dated May 19, 2017 of PCT Application No. PCT/US2016/047971, 14 pages.
Academy, "H2O XPRESS PRO Tackle Bag II," on sale at least as of Apr. 1, 2022 (https://www.academy.com/p/h2o-xpress-pro-tackle-bag-ii?sku=blue ) (Year: 2022).
Amazon, "Westfield Fishing Tackle Bag Water Resistant Soft Sided Waist Shoulder Carry Storage Hiking Climbing Fly," on sale at least as of Apr. 1, 2022 (https://www.amazon.co.uk/Westfield-Fishing-Resistant-Shoulder-Climbing/dp/B01H6WE47Y) (Year: 2022).
Bass Pro Shops, "Bass Pro Shops Advanced Anglers II Large Tackle System," on sale at least as of 204-01-2022, (https://www.basspro.com/shop/en/bass-pro-shops-advanced-anglers-ii-large-tackle system) (Year: 2022).
Bass Pro Shops, "Cabela's Extreme Wide-Top Tackle Bag," on sale at least as of Apr. 1, 2022 (https://www.basspro.com/shop/en/cabelas-extreme-wide-top-3600-tackle-bag) (Year: 2022).
Bass Pro Shops, "Plano B-Series 3600 Tackle Bag," on sale at least as of Apr. 1, 2022 (https://www.basspro.com/shop/en/plano-b-series-3600-tackle-bag) (Year: 2022).
Walmart, "Ozark Trail 370 Large Pro Quick Access Soft Sided Fishing Tackle Bag", on sale at least as of Apr. 1, 2022 (https://www.walmart.com/ip/Ozark-Trail-370-Large-Pro-Quick-Access-Soft-Sided-Fishing-Tackle-Bag-Black/474776073 ) (Year: 2022).
U.S. Appl. No. 29/800,531, filed Jul. 21, 2021, Colt Fadal.
Plano A—Series 2.0 Quick Top, unknown first available date, planomolding.com [online], [site visited Jan. 9, 2023], Available at URL: https://planomolding.com/products/aseries-20-quick-top-plaba700?variant=4046805427 8304 (Year. 2023).
Plano Guide Series 3600 Tackle Bag, unknown first available date, tacklecove.com [online], [site visited Jan. 9, 2023], Available at URL:https://www.tacklecove.com/store/p/496-Plano-Guide-Series-3600-Tackle-Bag.aspx (Year: 2023).

* cited by examiner

FOLDABLE TACKLE BAG

CROSS-REFERENCE TO RELATED APPLICATIONS

This application which claims the benefit of U.S. Provisional Application No. 62/872,243, filed Jul. 9, 2019, U.S. Provisional Application No. 62/872,249, filed Jul. 10, 2019, and U.S. Provisional Application No. 62/872,247, filed Jul. 10, 2019, is a continuation-in-part application of co-pending U.S. Design application Ser. No. 29/697,577, filed Jul. 10, 2019 entitled "Tackle Bag with Hooks and Saddle Bags," and co-pending U.S. Design application Ser. No. 29/697,580, filed Jul. 10, 2019 entitled "Backpack with Hooks and Saddle Bags," the technical disclosures of all of which are hereby incorporated by reference in their entirety.

BACKGROUND

Technical Field

The present disclosure relates to portable storage devices. More particularly, and not by way of limitation, the present disclosure is directed to an apparatus, system, and method for folding storage compartments in portable storage devices.

Background

This section is intended to provide a discussion of related aspects of the art that can be helpful to understanding the embodiments discussed in this disclosure. It is not intended that anything contained herein be an admission of what is or is not prior art, and accordingly, this section should be considered in that light.

Bags are a convenient way to carry large or small items. Bags can have handles so that they can be carried by hand, or straps that allow the bags to be carried on a user's body. For example, slings or backpacks have straps that allow the bag to be carried on a user's shoulders. Likewise, a fanny pack has a strap that allows the bag to be carried around a user's waist.

Bags can be specially configured for specialized use cases. For example, tackle boxes are designed to allow a user to carry tackle gear, food, and/or clothing.

BRIEF SUMMARY

This summary provides a discussion of aspects of certain embodiments of the disclosure. It is not intended to limit the disclosure or any of the claimed subject matter. The summary provides some aspects but there are aspects and embodiments of the disclosure that are not discussed here.

The present disclosure is directed to portable storage device with a foldable storage section. The portable device can have a main storage compartment defined by a front wall, a rear wall, a first side wall, a second side wall, and a bottom wall, with each of said walls being of a cloth like material. The portable device may further have a top portion that is coupled to one or more of the said walls and capable of covering an opening defined by the main storage compartment, wherein the top portion has at least one securing mechanism to couple to a counterpart securing mechanism found on the outer side of the wall opposing the wall that the top portion is coupled to. The main storage compartment of the portable device can be sized and shaped to house at least one folding storage compartment having a front section, a first side section, a second side section, a rear section, a bottom section, and a top section, these sections may be coupled to the first or second side walls.

In another aspect, the present disclosure is directed to a storage system having at least one storage tray. The storage tray(s) having a top section, a bottom section, and a securing mechanism to removably coupled the top section and bottom section together. The storage system also includes a storage apparatus configured to carry the at least one storage tray within a main storage compartment that is defined by a front wall, a rear wall, a first side wall, a second side wall, and a bottom wall, with each of said walls being of a cloth like material. The storage apparatus can have a top portion that is coupled to one or more of the said walls and capable of covering an opening defined by the main storage compartment and that secured with at least one securing mechanism that couples to a counterpart securing mechanism found on the outer side of the wall opposing the wall that the top portion is coupled to. The main storage compartment of the portable device can be sized and shaped to house at least one folding storage compartment having a front section, a first side section, a second side section, a rear section, a bottom section, and a top section, these sections may be coupled to the first or second side walls.

In yet another aspect, the present disclosure is directed to a method of manufacture of a storage apparatus. The storage apparatus can be manufactured by cutting fabric like materials to create a front wall, rear wall, a first side wall, a second side wall, a bottom wall, and a removably coupled top of a main storage compartment. Additionally, there may be further cutting of fabric like materials to create a front folding section, a first side folding section, a second side folding section a rear folding section, and a bottom folding section of a foldable storage compartment. The cut pieces can then by sewn together to create the main storage compartment and the foldable storage compartment. A coupling through a stitching process of the main storage compartment and foldable storage compartment allows the first side folding section and the first side wall, the second side folding section and the second side wall, and the bottom section and bottom walls to be coupled to one another.

BRIEF DESCRIPTION OF THE DRAWINGS

The novel features believed characteristic of the disclosure are set forth in the appended claims. The disclosure itself, however, as well as a preferred mode of use, further objectives and advantages thereof, will be best understood by reference to the following detailed description of illustrative embodiments when read in conjunction with the accompanying drawings, wherein:

DETAILED DESCRIPTION

An embodiment of the disclosure will now be described. Fishing equipment such as tackle boxes often have storage compartments which prevent fishermen from viewing any secured content. Since many tackle boxes are often used while fishermen are standing in water, the fishermen often must risk exposing at least one entire storage compartment's contents to water to simply see or access stored items. Most tackle boxes are designed to store bait trays within their sealed storage compartments. Although bait trays often are designed to allow fishermen to view stored contents while sealed, fishermen often lose all visibility to a bait tray's contents when the bait tray is stowed inside a sealed tackle box.

One of the additional downfalls of these devices is that often there is no manner or means for adjusting a tackle box's storage size. In many cases, tackle boxes are designed to hold a static number of bait trays. When a fisherman requires less bait trays than a tackle box is designed to store, fishermen often must choose to either use a smaller tackle box, underfill bait trays, and/or underfill the tackle box.

Another of the additional downfalls of these devices is that often there is no manner or means for creating a flat surface inside a tackle box. In many cases a fisherman must utilize external devices to create a flat surface while standing in water. Often these external devices are not secured to the fisherman's body and carry the risk of falling into water.

The novel aspects disclosed herein describe an apparatus, system, and method for addressing these challenges.

Figure 1A:
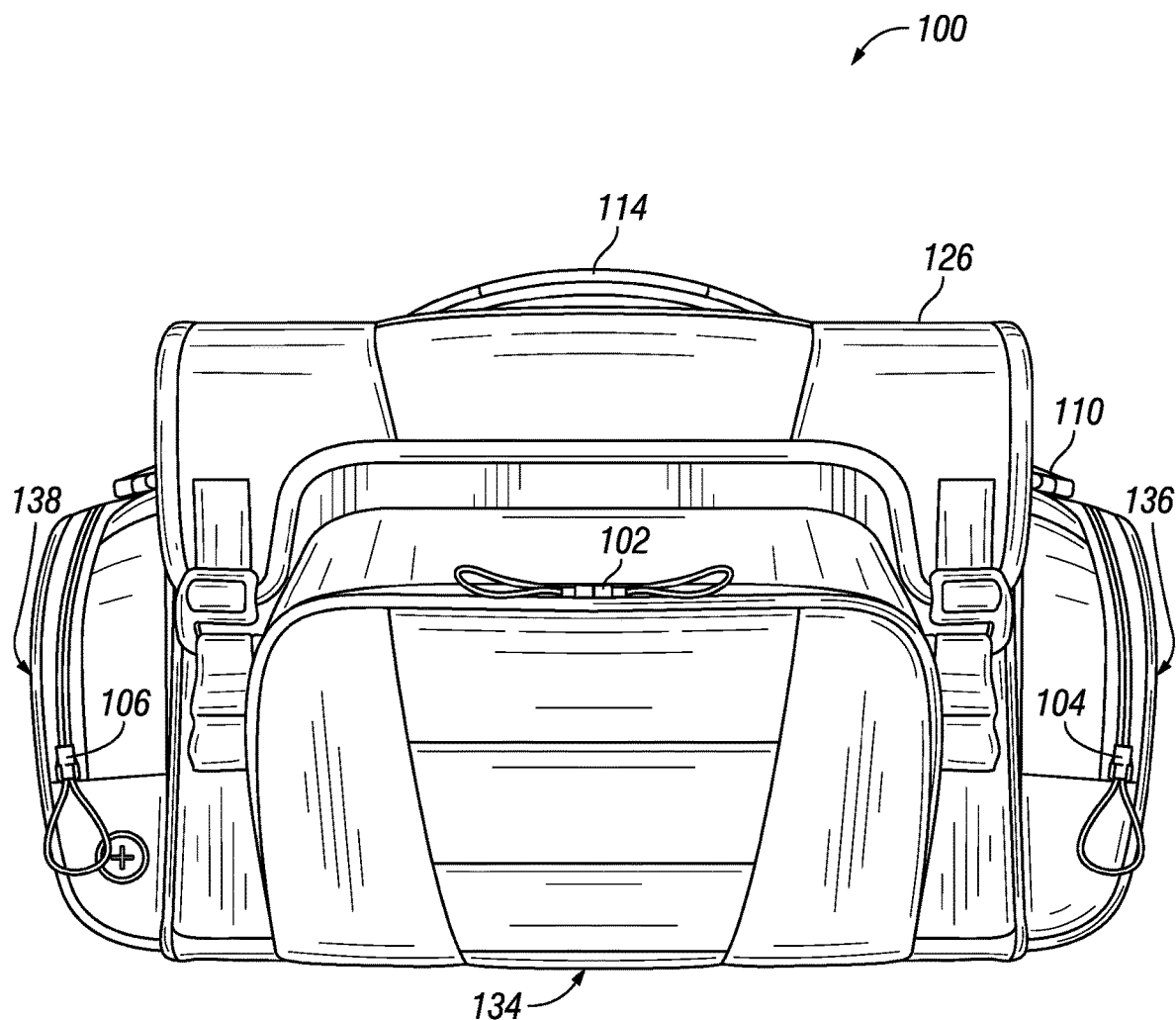
FIG. 1A is an illustration of the front of a cloth tackle bag from a front perspective view.

FIGS. 1A-1E illustrates an enclosed cloth tackle bag 100 from a plurality of views. FIG. 1A illustrates at least one example of a the cloth tackle bag 100 that may have at least one storage section such as a front storage section 134, a first side storage section 136, or a second side storage section 138. At least one fastener may allow items to be secured or removed from a storage section. In at least one example, a front storage fastener 102 may secure items inside of the front storage section 134. Similarly, a first side storage fastener 104 may secure items inside the first side storage section 136 and a second side storage fastener 106 may secure items inside the second side storage section 138. The front storage fastener 102, the first side storage fastener 104, or the second side storage fastener 106 may be a plurality of storage couplers including, but not limited to, at least one zipper, hook and loop, buttons, snaps, and/or other fasteners or combinations thereof.

In at least one example, the cloth tackle bag 100 may have at least one handle 114. A handle 114 may be made of materials including, but not limited to, cloth straps, vinyl straps, rope, plastic straps, and/or other similar materials. A handle 114 may attach to the removably coupled top 126 or another area of cloth tackle bag 100 capable of supporting weight using cloth tackle bag handle couplers including, but not limited to, stitching, thread, glue, adhesive, or fasteners or combinations thereof.

Figure 1B:
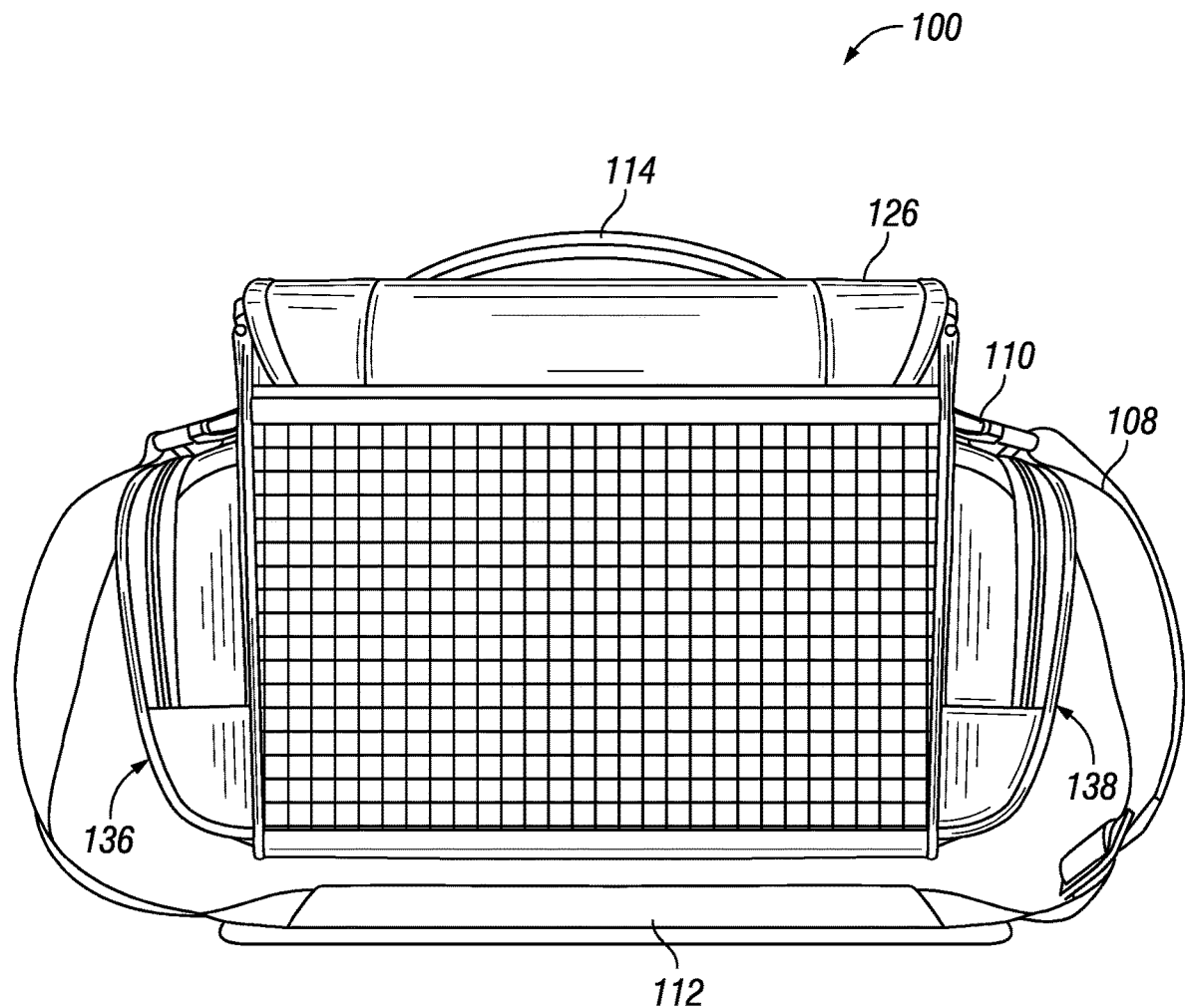
FIG. 1B is an illustration of the rear of a cloth tackle bag from a rear perspective view.

FIG. 1B illustrates at least one example of the cloth tackle bag 100 may have at least one shoulder strap 108. Shoulder strap 108 may be constructed of materials including, but not limited to, cloth straps, vinyl straps, rope, plastic straps, and/or other similar materials. The shoulder strap 108 may attach to the cloth tackle bag 100 using at least one shoulder strap fastener 110. A shoulder strap fastener 108 could use a plurality of shoulder strap couplers including, but not limited to, at least one zipper, hook and loop, buttons, snaps, other fasteners or connections, or combinations thereof. In at least one embodiment, a plurality of shoulder strap fasteners 110 may attach to the cloth tackle bag 100 to allow shoulder strap 108 to be partially or entirely disconnected from the cloth tackle bag 100. The shoulder strap 108 may have a shoulder strap guard 112 made of materials including, but not limited to, cloth, plastic, canvas, vinyl, other similar materials or combinations thereof. The shoulder strap guard 112 may slide loosely along the shoulder strap 108 or be fixed to the shoulder strap 108 using a plurality of shoulder strap guard couplers including, but not limited to, stitching, thread, glue, adhesive, hook and loop, button and slot, snaps, or fasteners or combinations thereof.

Figure 1C:
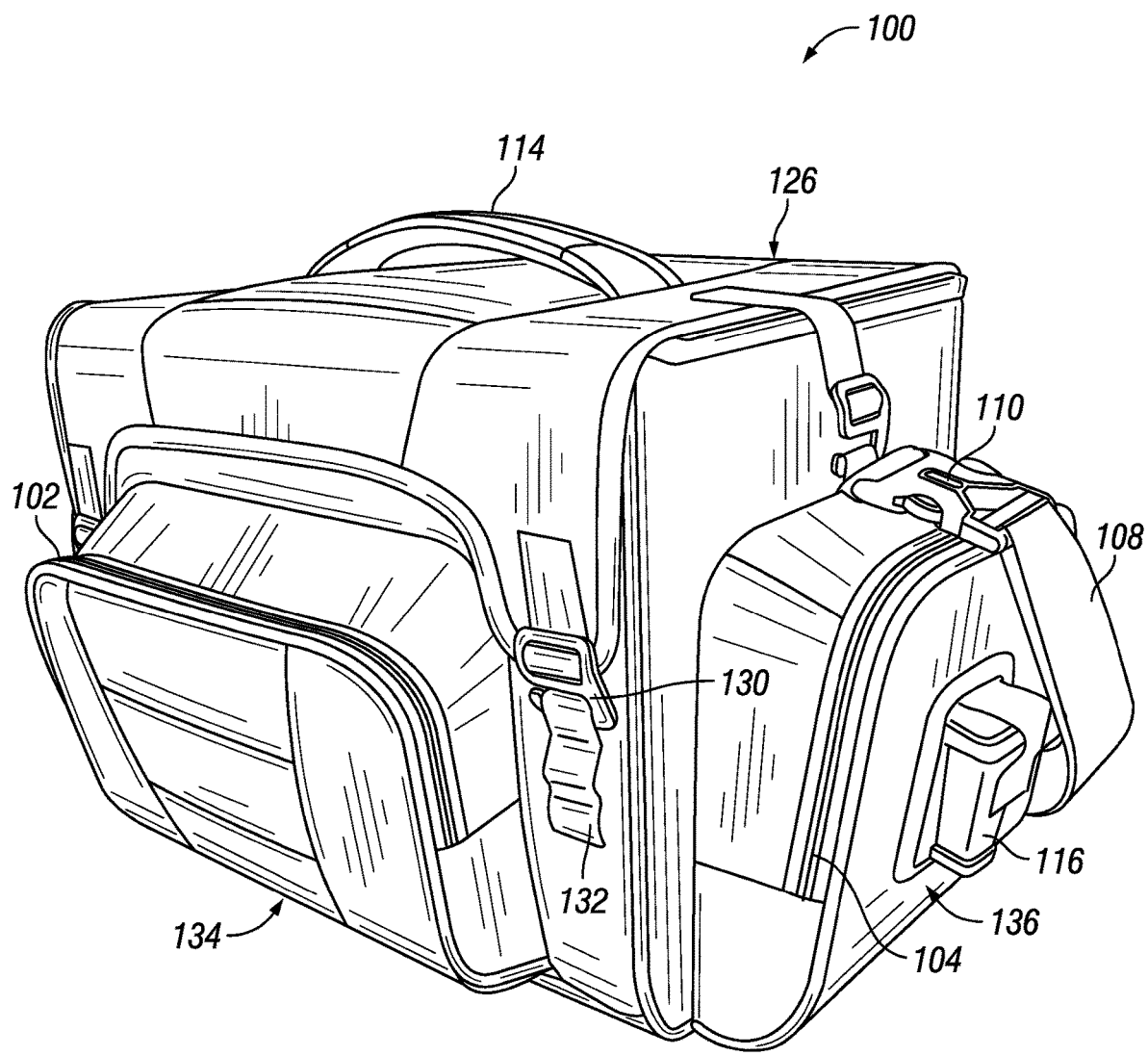
FIG. 1C is an illustration of the first side of a cloth tackle bag from a right side perspective view.
Figure 1D:
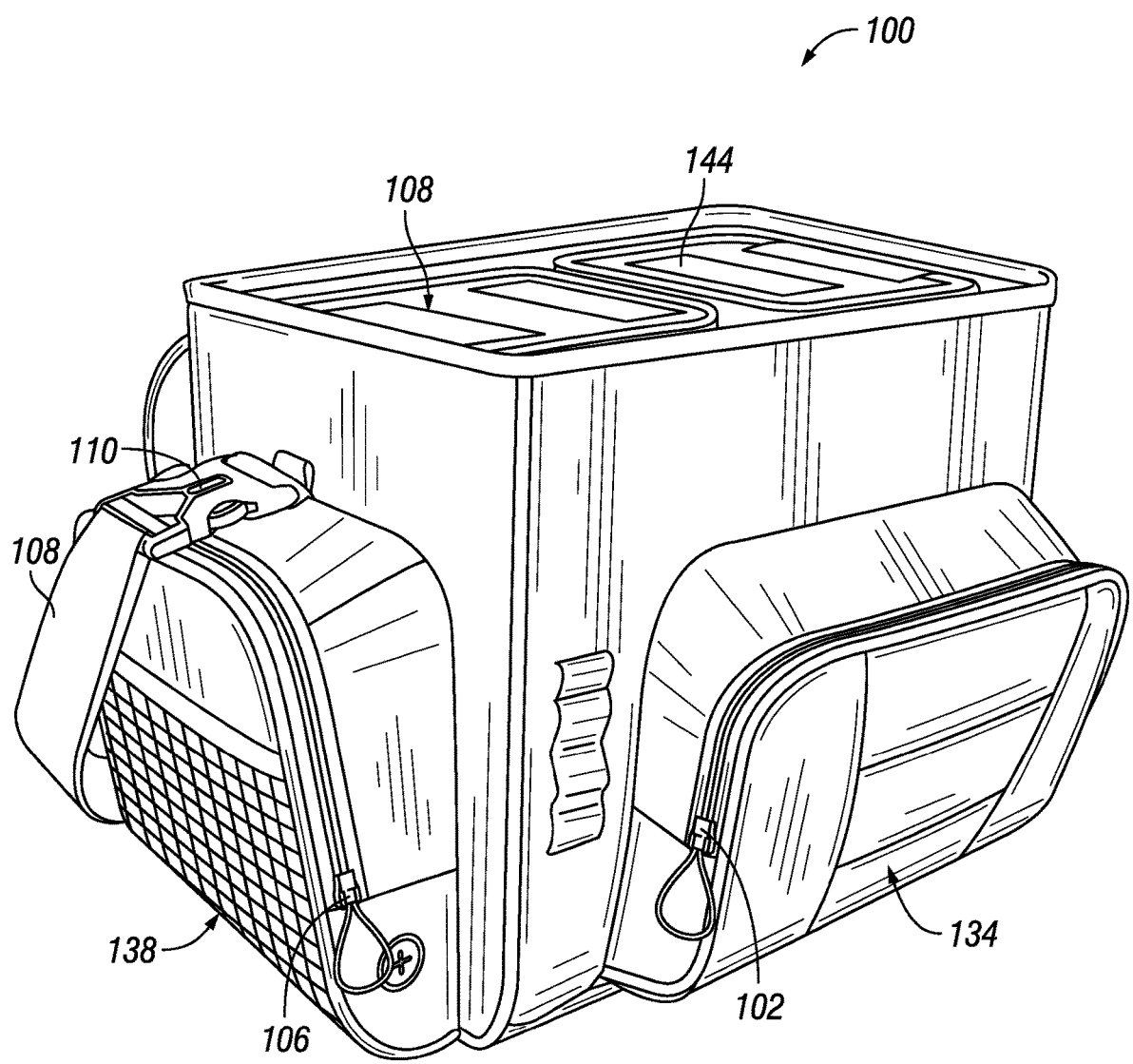
FIG. 1D is an illustration of an unopened state cloth tackle bag with an unsecured top from a perspective view.

FIG. 1C and FIG. 1D illustrate at least one example of the cloth tackle bag 100 that can have at least one storage pouch 116. A storage pouch 116 may have a plurality of sizes and be capable of accommodating at least one item. For example, a storage pouch 116 may attach to front storage section 134, a first side storage section 136, a second side storage section 138, or other locations on cloth tackle bag 100 or combinations thereof. The storage pouch 116 may be fixed to or detachable from cloth tackle bag 100 using a plurality of storage pouch couplers including, but not limited to, stitching, thread, glue, adhesive, hook and loop, button and slot, snaps, fasteners or connections, or combinations thereof.

In at least one embodiment, the removably coupled top 126 can be coupled to the main storage section 102 using at least one top cover G-Hook fastener 130 and at least one webbing loop fastener 132. In at least one example, the top cover G-Hook fastener 130 may be a hook fastener made of a solid material including, but not limited to, plastic, metal, or similar materials and/or combinations thereof. The top cover webbing loop fastener 132 may be made of a flexible or fabric like material including, but not limited to, cloth, vinyl, canvas, metal, plastic or other similar materials and/or combinations thereof. The top cover G-Hook fastener 130 may attach to the removably coupled top 126 using a plurality of top cover hook couplers including, but not limited to, stitching, thread, glue, adhesive, fasteners or connections, or combinations thereof. The top cover webbing loop fastener 132 may attach to a wall of the main storage compartment 102 such as the front wall using a plurality of top cover loop couplers including, but not limited to, stitching, thread, glue, adhesive, fasteners or connections, or combinations thereof.

In at least one example, the removably coupled top 126 may be secured using the top cover G-Hook fastener 130 and the top cover webbing loop fastener 132 to cover at least one folding storage compartments 118 folded within the main storage compartment 142. The removably coupled top 126 may close on top of the main storage compartment 142 containing the first folding storage compartment or the second folding storage compartment that are capable of holding at least one bait tray or other items. In some examples, the removably coupled top 126 may cover the main storage component 142 when there are no items or folding storage components 118 within the main storage component 142. The removably coupled top 126 may also close on top of the main storage compartment 142 while the first folding storage compartment 118 or the second folding storage compartment 118 are outside of the main storage compartment 142.

Figure 1E:
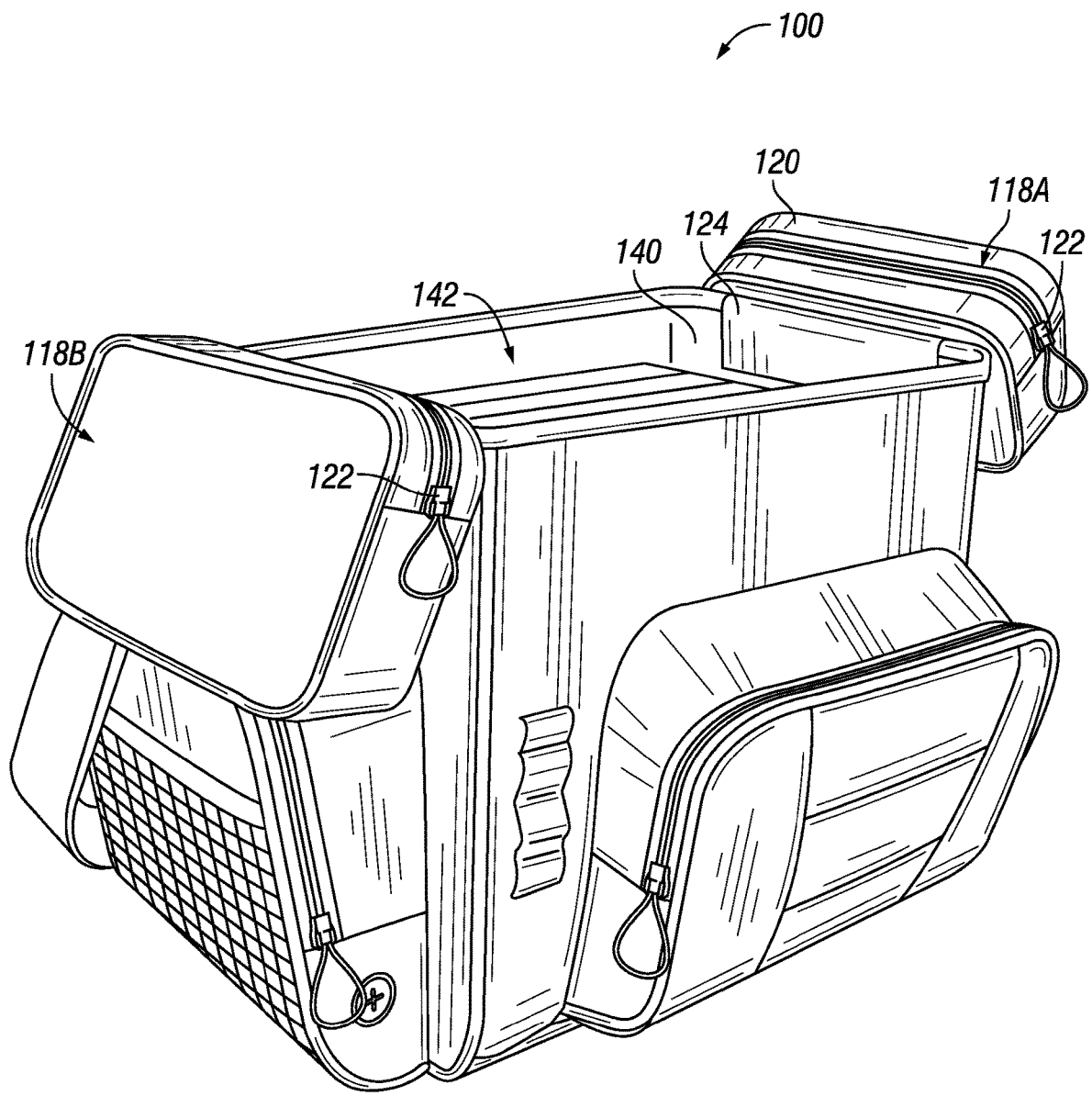
FIG. 1E is an illustration of an opened state cloth tackle bag with an unsecured top from a perspective view.
Figure 2A:
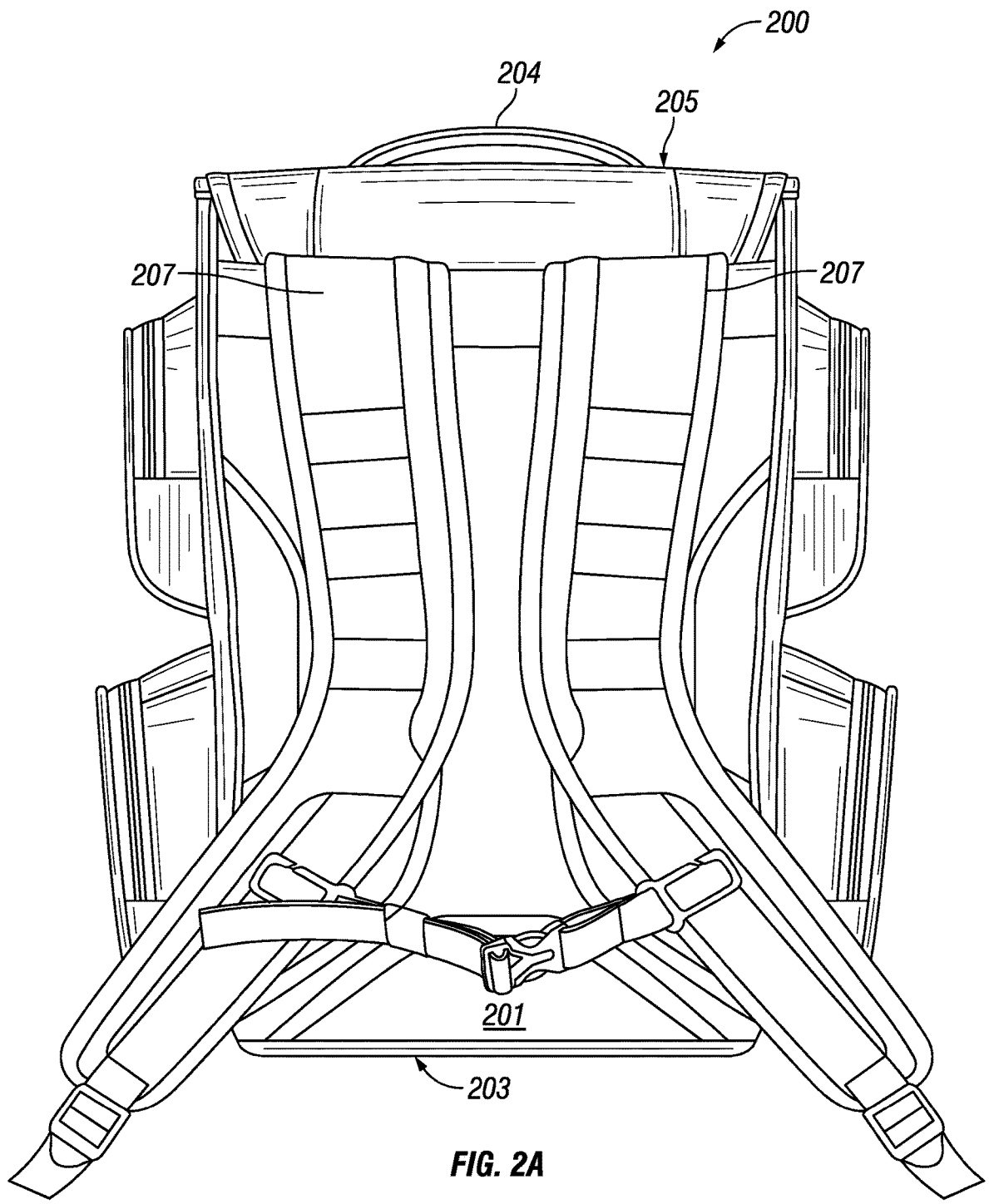
FIG. 2A is an illustration of the exterior back of a backpack.
Figure 2B:
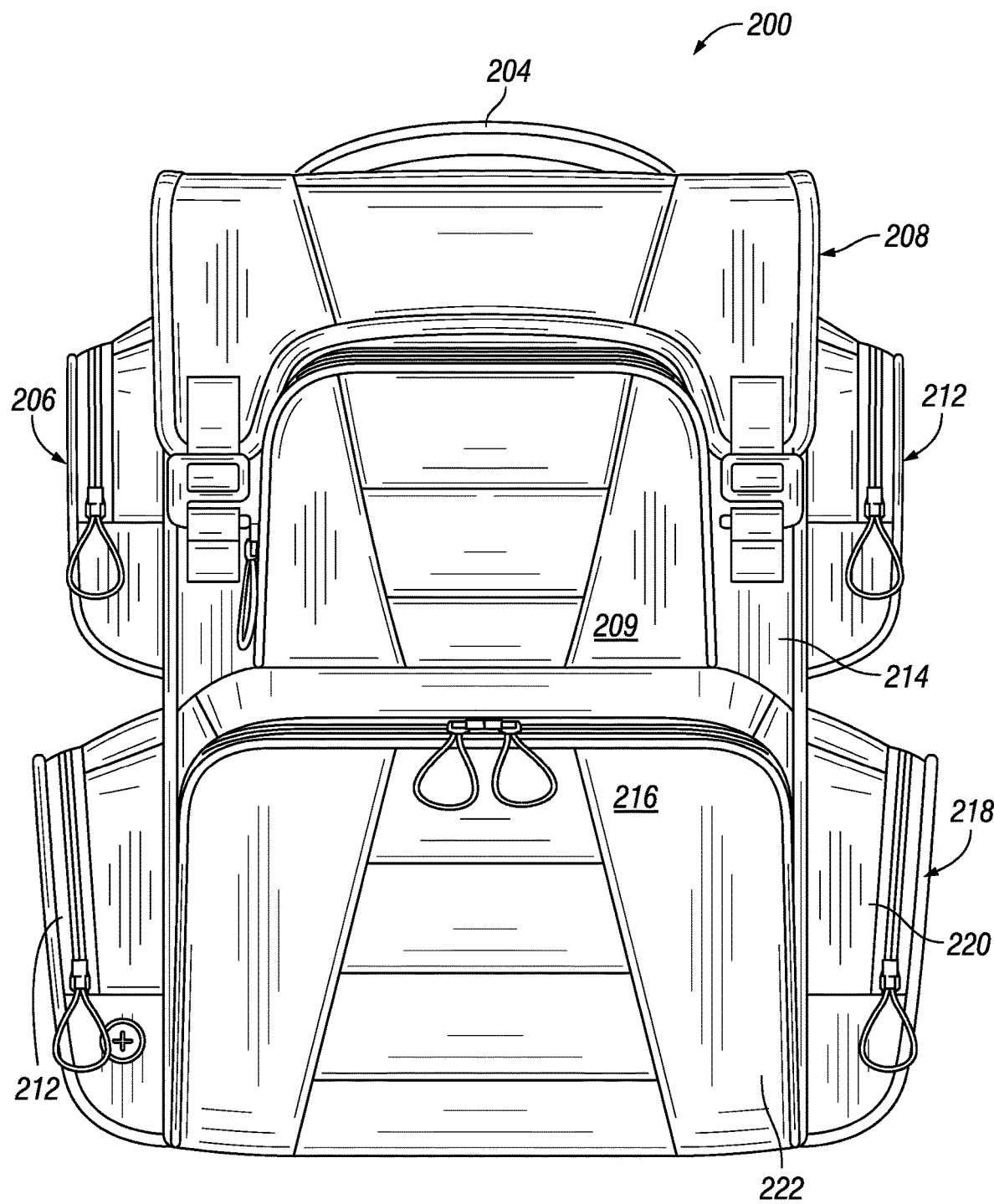
FIG. 2B is an illustration of the exterior front of a backpack.
Figure 2C:
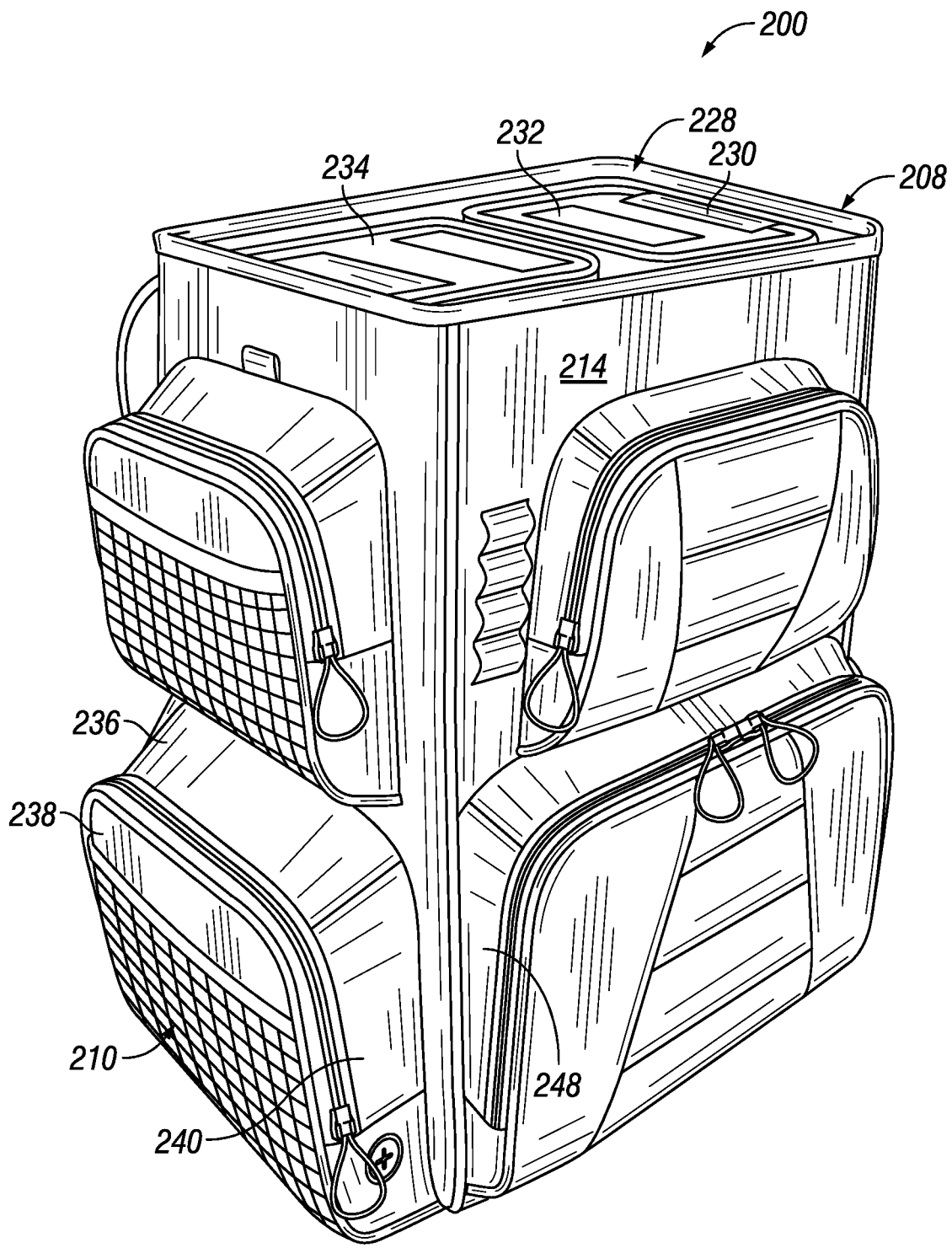
FIG. 2C is an illustration of the unexpanded top storage of a backpack.
Figure 2D:
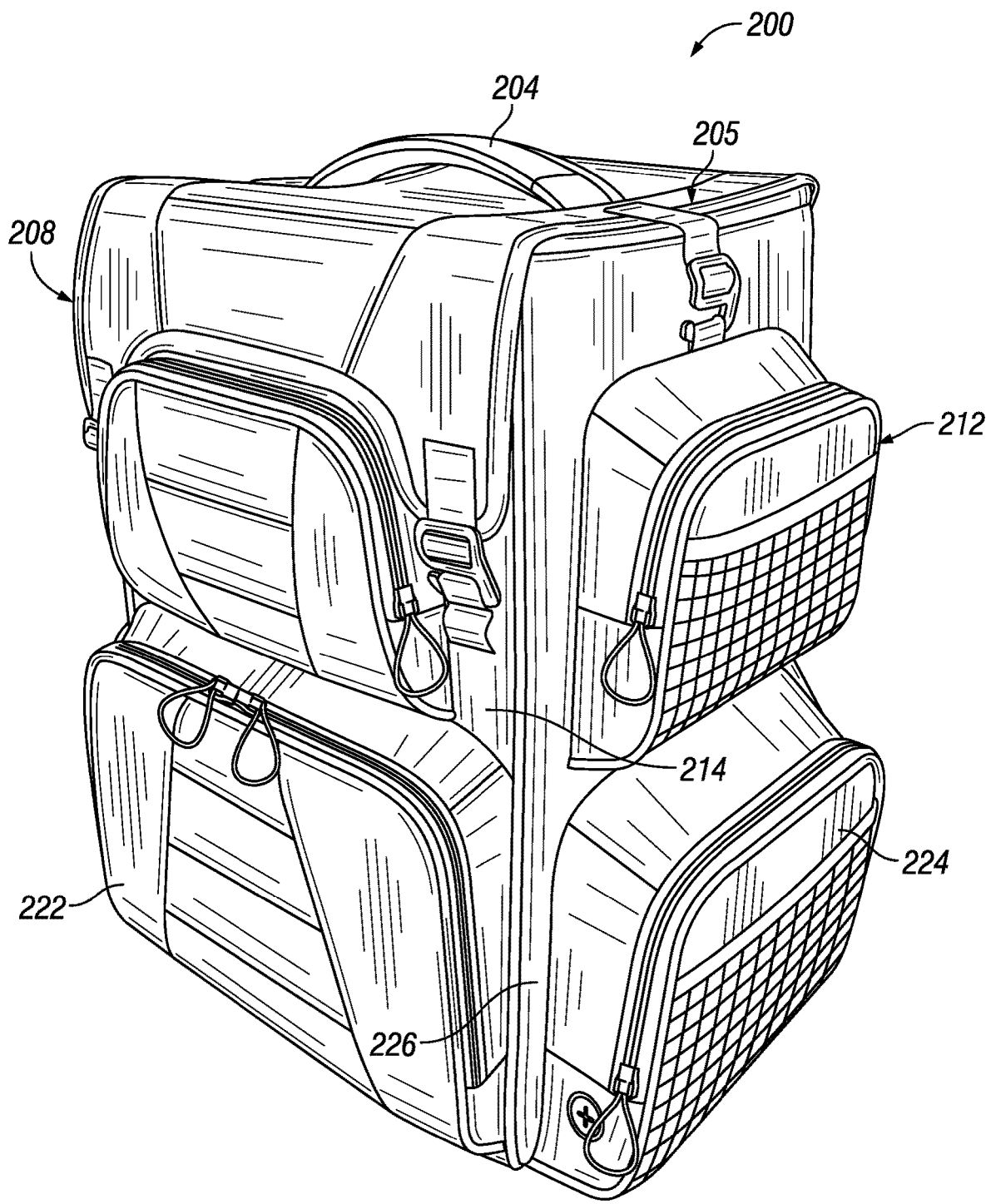
FIG. 2D is an illustration of the exterior of the main storage compartment of a backpack from a perspective view.
Figure 2E:
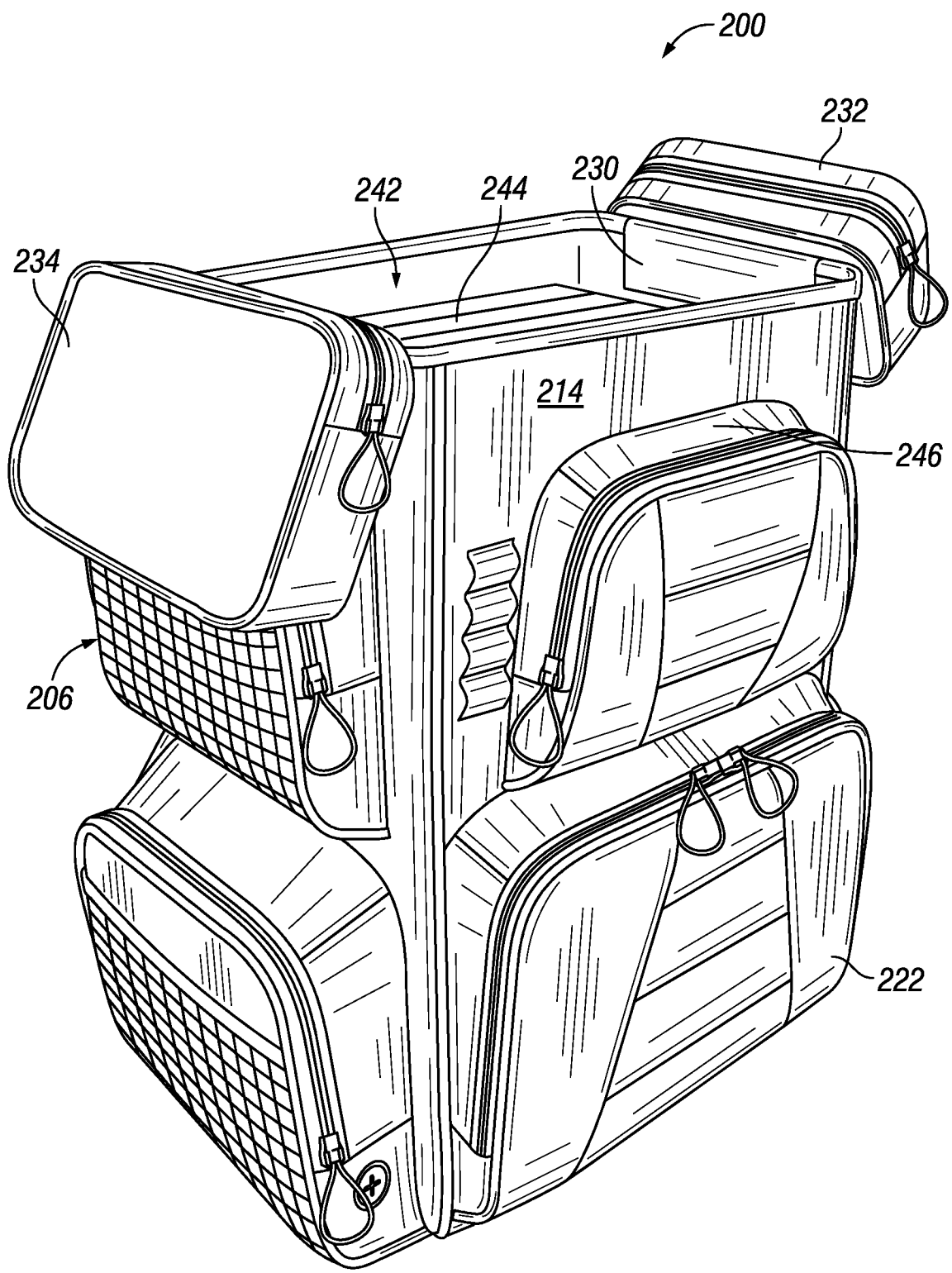
FIG. 2E is an illustration of the expanded main storage of a backpack.

In at least one example, as shown in FIG. 1E, a foldable hinge 124 such as the first foldable hinge 124 may act as a securing mechanism to connect the first folding storage compartment 118A to the first side wall 140. The foldable hinge 124 may be a plurality of materials including, but not limited to, cloth, vinyl, canvas, metal, plastic, other similar materials or combinations thereof. At least one portion of the first foldable hinge 124 may attach to the first folding storage compartment front wall and a second portion of the first foldable hinge 124 may attach to an upper portion of the first side wall 140 using a plurality of hinge couplers including, but not limited to, stitching, thread, glue, adhesive, hook and loop, button and slot, snaps, fasteners or connections, or combinations thereof. The first foldable hinge 118A may attach permanently or temporarily to the first front wall or the first side wall 140. The first foldable hinge 124 may allow the first folding storage compartment 118A to fold into and out from the main storage compartment 142 along the first side wall 140.

Similarly, a foldable hinge such as the second foldable hinge (not shown) may act as a securing mechanism to connect the second folding storage compartment 118B to the second side wall (not shown). The foldable hinge may be a plurality of materials including, but not limited to, cloth, vinyl, canvas, metal, plastic, other similar materials or combinations thereof. At least one portion of the second foldable hinge may attach to the second folding storage compartment front wall and a second portion of the second foldable hinge may attach to an upper portion of the second side wall using a plurality of hinge couplers including, but not limited to, stitching, thread, glue, adhesive, hook and loop, button and slot, snaps, fasteners or connections, or combinations thereof. The second foldable hinge may attach permanently or temporarily to the front wall or the second side wall. The second foldable hinge may allow the second folding storage compartment 118B to fold into and out from the main storage compartment 142 along the second side wall 140.

In at least one embodiment, a plurality of folding storage compartments such as the first folding storage compartment 118A or the second folding storage compartment 118B may fold within the main storage compartment 142. In at least one example, the main storage compartment 142 may accommodate at least one folding storage compartment 118A/118B or a plurality of additional items such as bait tray. A bait tray can generally have a structure that includes a top portion, a bottom portion, a plurality of walls, and at least one securing bait tray mechanism such as at least one clasp, at least one zipper, hook and loop, buttons, snaps, other fasteners or connections, or combinations thereof. Additionally, the bait tray may also be composed of at least partially transparent materials which allow fishermen to view a bait tray's contents without opening the tray.

In at least one embodiment, the folding storage compartment 118 can include a first folding storage compartment 118A or a second folding storage compartment 118B, each of which may have at least one handle 144. The handle 144 may attach to the folding storage compartment 118 using plurality of handle couplers including, but not limited to, stitching, thread, glue, adhesive, hook and loop, button and slot, snaps, fasteners or connections, or combinations thereof. The handle 144 may attach to folding storage compartment 118 at a plurality of locations such as a folding storage compartment front wall. The plurality of locations may be accessible while the folding storage compartment 118 is stored inside main storage container 142. In at least one embodiment, a folding storage compartment 118 may have a foldable hinge 126 and a handle 144 attached opposite one another along the folding storage compartment front wall. A foldable hinge 126 and a handle 144 attached opposite one another along the folding storage compartment front wall could mean that a foldable hinge 126 could attach to the folding storage compartment front wall near the folding storage compartment first side wall and a handle 144 attached to the folding storage compartment front wall near the folding storage compartment second side wall. Similarly, the first folding storage compartment 118A may have a first foldable hinge 126 and a handle 144 attached opposite one another along the first folding storage compartment front wall 140. Comparably, the second folding storage compartment 118B may have a second foldable hinge 126 and a handle 144 attached opposite one another along the second folding storage compartment front wall. The configuration of having a foldable hinge 126 and a handle 144 opposite one another along the same side may allow a user to pull on a handle 144 to cause folding storage compartment 118 stored within the main storage compartment 142 to be removed or swing outwardly out from the main storage compartment 142.

In at least one embodiment, a front storage section 136 may be attached to the front wall. Similarly, a first side storage section 136 may be attached to the first side wall and a second side storage section 138 may be attached to the second side wall. The front storage section 134, first side storage section 136, or the second side storage section 138 may have a rigid structure, a flexible structure or some combination thereof In at least one example, the front storage section 134, first side storage section 136, or the second side storage section 138 may have a rigid interior layer made of solid material including, but not limited to, plastic, metal or other solid materials with at least one exterior layer of supportive materials including, but not limited to, cloth, vinyl, canvas, other similar materials or combinations thereof. In at least one embodiment, the front storage section 134, first side storage section 136, or the second side storage section 138 may also have both an interior and exterior composed of flexible materials such a cloth, vinyl, canvas, other similar materials or combinations thereof.

The front storage section 134, first side storage section 136, or the second side storage section 138 may be detachable from or fixed to the walls of the main storage compartment 142. In at least one embodiment, the front storage section 134, first side storage section 136, or the second side storage section 138 may be fixed to the walls of the main storage compartment 142 using a plurality of fixed storage section couplers including, but not limited to, stitching, thread, glue, adhesive, fasteners, or combinations thereof. In at least one other embodiment, the front storage section 134, first side storage section 136, or the second side storage section 138 may be detachable from the walls of the main storage compartment 142 using a plurality of removable storage section couplers including, but not limited to, at least one zipper, hook and loop, buttons, snaps, other fasteners, or combinations thereof.

FIG. 1E is an illustration of an opened cloth tackle bag with an unsecured top from a second side perspective view. In at least one example, the cloth tackle bag 100 may have at least one folding storage section 118 may attach to a wall of the main storage section 142 such as the first side wall 140 through the use of a foldable hinge 124. At least one folding section fastener 122 may allow items to be secured within or removed from a folding storage section 100. The folding section fastener 122 may be a plurality of folding section couplers including, but not limited to, at least one zipper, hook and loop, buttons, snaps, other fasteners or combinations thereof. In at least one embodiment, the folding section fastener 122 may be a part of folding storage compartment top portion 120 or another wall along folding section 100. When folding section fastener 122 is along the folding storage compartment top portion 120 such that the contents of folding section 100 may be accessed after folding section 100 unfolds from within the main storage section 142.

The folding storage compartment 118 may have a generally rectangular cross-sectional shape. The folding storage compartment may have a folding storage compartment front wall, a folding storage compartment rear wall, a first folding storage compartment side wall, a second folding storage compartment side wall, a folding storage compartment bottom wall, or a folding storage compartment top portion. In at least one example, the walls of folding storage compartment 118 may have a rigid interior layer made of solid materials including, but not limited to, plastic, metal or other solid materials with exterior layers of supportive materials including, by not limited to, cloth, vinyl, canvas, or other similar materials. The walls of folding storage compartment 118 may also have both an interior and exterior composed of flexible materials such a cloth, vinyl, canvas, or other similar materials. The folding storage compartment 118 may have a plurality of shapes and sizes. A handle 144 and a foldable hinge 124 may attach to folding storage compartment 118 along a plurality of sides. The handle 144 may be made of materials including, but not limited to, cloth, vinyl, rope, plastic, or other similar materials. The foldable hinge 124 may be a plurality of materials including, but not limited to, cloth, vinyl, canvas, metal, plastic other similar materials or combinations thereof. In at least one example in the present disclosure, the handle 144 and foldable hinge 124 may attach to the folding storage compartment front wall using a plurality of hinge couplers including, but not limited to, stitching, thread, glue, adhesive, hook and loop, button and slot, snaps, fasteners or connections, or combinations thereof.

The cloth tackle bag 100 may have a main storage compartment 142. The main storage compartment 142 may have a generally rectangular cross-sectional shape. The main storage compartment 142 may have a front wall, a rear wall, a first side wall, a second side wall, or a bottom wall. In at least one embodiment, the main storage compartment may further contain a removably coupled top 126. In at least one example, the front wall, the rear wall, the first side wall, the second side wall, the bottom wall or the removably coupled top 126 may have a rigid interior layer made of solid materials including, but not limited to, plastic, metal or other solid materials with exterior layers of supportive materials including, by not limited to, cloth, vinyl, canvas, other similar materials or combinations thereof. In at least one embodiment, the front wall, the rear wall, the first side wall, the second side wall, the bottom wall or the removably coupled top 126 may also have both an interior and exterior composed of flexible materials such a cloth, vinyl, canvas, other similar materials, or combinations thereof In at least one example, fabric like material may be cut to create the front wall, the rear wall, the first side wall, the second side wall, the bottom wall or the removably coupled top 126 of the main storage compartment 142. The fabric like material may include canvas, vinyl, thread, rope, synthetic fibers, polyester, other fabric or fabric like materials, or combinations thereof.

The cloth tackle bag 100 may have at least one folding storage compartment 118 capable of storing inside the main storage compartment 142. In at least one example, cloth tackle bag 100 can have a plurality of folding storage compartments 118 such as a first folding storage compartment 118A or a second folding storage compartment 118B. The first folding storage compartment 118A or the second folding storage compartment 118B may have at least one flat interior storage space capable of storing a plurality of items. In at least one embodiment, the first folding storage compartment 118A or the second folding storage compartment 118B can be configured for storage inside the main storage compartment 142. The first folding storage compartment 118A may have a first folding storage compartment front wall and the second folding storage compartment 118B may have a second folding storage compartment front wall which may be visible when the folding storage compartments rests within the main storage compartment 142.

In some examples, the folding storage compartment 118 including the first folding storage compartment 118A or the second folding storage compartment 118B may have a rigid structure, a flexible structure, or some combination thereof. In at least one example, the folding storage compartment 118 including first folding storage compartment 118A or the second folding storage compartment 118B may have a rigid interior layer made of solid material including, but not limited to, plastic, metal or other solid materials with at least one exterior layer of supportive materials including, by not limited to, cloth, vinyl, canvas, other similar materials or combinations thereof. The folding storage compartment 118 including the first folding storage compartment 118A or the second folding storage compartment 118B may have both an interior and exterior composed of flexible materials such a cloth, vinyl, canvas, other similar materials or combinations thereof.

In at least one example, a foldable hinge such as a first foldable hinge 124 may act as a securing mechanism to connect the first folding storage compartment 118A to the first side wall 140. The first foldable hinge 124 may be a plurality of materials including, but not limited to, cloth, vinyl, canvas, metal, plastic, other similar materials, or combinations thereof. At least one portion of the first foldable hinge 124 may attach to the first front wall 140 or a second portion of the first foldable hinge 124 may attach to an upper portion of the first side wall 140 using a plurality of hinge couplers including, but not limited to, stitching, thread, glue, adhesive, hook and loop, button and slot, snaps, fasteners or connections, or combinations thereof. The first foldable hinge 124 may permanently or temporarily attach to the first folding storage compartment front wall or the first side wall 140. The first foldable hinge 124 may allow the first folding storage compartment 118A to fold into or out of the main storage compartment 142 along the first side wall 140.

The cloth tackle bag 100 may have a main storage compartment 142 capable of storing at least one folding storage section 118. A folding storage section 118 may attach to a main storage compartment 142 using a foldable hinge 124. In at least one example, the folding storage section 118 may attach to the first side wall 140 of the main storage compartment 142 using the foldable hinge 124. When stored within a main storage compartment, the folding storage section 118 may rest entirely inside the main storage section 142. With the use of the foldable hinge 124, the folding storage section 118 may swing out to become parallel to the first side wall 140 and perpendicular to a longitudinal axis of bottom wall of the main storage section 142. When the foldable hinge 124 fully extends, the folding storage section 118 may rest against the first side wall 140 of the main storage compartment 142. When a first side storage section is attached to the first side wall 140, the folding storage section 142 may rest against or on top of the first side storage section.

FIGS. 2A-2E are illustrations of backpack 200. With reference to FIGS. 2A-2E, a backpack 200 can be a storage device capable of being carried by a user (not illustrated) with at least one strap 207. In at least one embodiment, the at least one strap 207 may comprise two or more straps. The backpack 200 may generally have a rectangular shape defined by a back wall 201, a front wall 214, a first side wall 212, a second side 206, a bottom wall 203, or a top wall 205. In at least one example, the back wall 201, front wall 214, first side wall 212, the second side 206, a bottom wall 203, or a top wall 205 may have a rigid interior layer made of solid materials including, but not limited to, plastic, metal or other solid materials with exterior layers of supportive materials including, but not limited to, cloth, vinyl, canvas, other similar materials, or combinations thereof. In at least one embodiment, the back wall 201, the front wall 214, the first side wall 212, the second side 206, the bottom wall 203, or the top wall 205 can be constructed having both an interior and exterior composed of flexible or fabric like materials such a cloth, vinyl, canvas, other similar materials, or combinations thereof. Fabric like materials may be cut to create in a pattern that defines and creates the back wall 201, front wall 214, first side wall 212, the second side 206, a bottom wall 203, or a top wall 205 of the backpack 200.

In at least one example, a top storage compartment 208 may be defined by the top wall 205, a front panel 209, the first side wall 212, the second side wall 206, or a top portion bottom panel 228. A first side storage compartment 218 may be defined by to the first side wall 212, a rear first side panel, a front first side panel 220, a first side top panel, a first side outward panel 224 or a first side bottom panel. A second side storage compartment 212 may be defined by the second side wall 206, a rear second side panel, a front second side panel 240, a second side outward panel, a second side top panel 236 or a second side bottom panel. A front storage compartment 222 may be defined by the front wall 214, a front left panel 248, a front right panel 226, a front top panel 246, a front outward panel 216, or a front bottom panel. In at least one embodiment, the top storage compartment 208, the first side storage compartment 218, the second side storage compartment 212, or the front storage compartment 214 can have a rigid structure, a flexible structure, or some combination thereof. In at least one example of the present disclosure, the top storage compartment 208, the first side storage compartment 218, the second side storage compartment 212, or the front storage compartment 222 may have a rigid interior layer made of solid material including, but not limited to, plastic, metal or other solid materials with at least one exterior layer of supportive materials including, but not limited to, cloth, vinyl, canvas, other similar materials, or combinations thereof. In at least one embodiment, the top storage compartment 208, the first side storage compartment 218, the second side storage compartment 212, or the front storage compartment 222 can be constructed having an interior and exterior composed of fabric like or flexible materials such a cloth, vinyl, canvas, other similar materials, or combinations thereof. The backpack 200 may have additional storage compartments coupled to its exterior.

The backpack 200 can also include two folding storage compartments 234. The folding storage compartments 234 may be defined by a top, a first side, a second side, a first endwall, a second endwall, or a bottom. In at least one embodiment, the two folding storage compartments 234 can be coupled to the main storage compartment, first wall, or second wall. The coupling can be through a coupling hinge 230. The coupling hinge 230 can allow for the folding storage compartments to swing or rotate from within the main storage compartment, to an area generally adjacent to the main storage compartment on the exterior of the backpack 200, or parallel with the first or second wall.

It is within the scope of the present disclosure for the top storage compartment 208, the first side storage compartment 218, the second side storage compartment 212, or the front storage compartment 222 to be detachable from or to the walls of backpack 200 using a plurality of couplings including, but not limited to, stitching, thread, glue, adhesive, hook and loop, button and slot, snaps, fasteners or connections, or combinations thereof. In at least one example of the present disclosure, the backpack 200 may have a main storage compartment 242 capable of accommodating bait tray 244. A main storage compartment 242 could be defined by the back wall 201, the front wall 214, the first side wall 212, the second side 212, a bottom wall 203, or a top wall 205. A user could access main storage compartment 242 using a plurality of fasteners including, but not limited to, at least one zipper, hook and loop, button and slot, snaps, other types of fasteners or connections, or combinations thereof. In at least one embodiment, the back wall 201, the front wall 214, the first side wall 212, the second side 206 may have a foldable storage compartment (as described in FIGS. 1A-1E) coupled to one or more of the walls.

In at least one example of the present disclosure, the backpack 200 may have at least one shoulder strap 207. It is within the scope of the present disclosure for shoulder strap 207 to be attached to at least one point along the back wall 201, front wall 214, first side wall 212, the second side 206, a bottom wall 203, or a top wall 205 of the backpack 200, or other similar areas of backpack 200 capable of supporting weight using a plurality of couplings including, but not limited to, stitching, thread, glue, adhesive, hook and loop, button and slot, snaps, fasteners or connections, or combinations thereof. Shoulder strap 207 may be constructed utilizing materials such as, but not limited to, cloth, vinyl, rope, plastic, other similar materials, or combinations thereof.

In some examples, the folding storage compartment 234 (as shown in FIGS. 1D-1E as 118) may be attached to a backpack 200 using a plurality of couplings including, but not limited to, stitching, thread, glue, adhesive, hook and loop, button and slot, snaps, fasteners or connections, or combinations thereof. It is within the scope of the present disclosure for folding storage compartment 234 to attach to a plurality of places along backpack 200 such as back wall 201, front wall 214, first side wall 212, or the second side 206. In other examples, the backpack 200 may have a structure comparable to folding side using folding side brace. Such a structure could allow a wall such as a front wall 214 to separate from backpack 200 at a perpendicular angle transforming the wall into flat surface which may persist while a fisherman carries backpack 200.

In at least one example, the cloth tackle bag 100 or the backpack 200 may be manufactured using the following steps: cutting fabric like materials to create a front wall, rear wall, a first side wall, a second side wall, a bottom wall, and a removably coupled top of a main storage compartment; cutting fabric like materials to create a front folding section, a first side folding section, a second side folding section, and a bottom folding section of an expandable storage compartment; sewing said sections and walls together to create the main storage compartment and the expandable storage compartment; and coupling the main storage compartment and expandable storage compartment, wherein the first side folding section and the first side wall, the second side folding section and the second side wall, and the bottom section and bottom walls are coupled to one another through a stitching process.

While fishing equipment is referenced herein, the present disclosure could be utilized for other purposes, including, but not limited to, luggage, coolers, other similar portable storage devices, or combinations thereof. In certain embodiments, the present disclosure may include a plurality of fishing equipment such as tackle bags and bait boxes. The fishing equipment may contain a main storage compartment and a plurality of attached storage sections including an expandable and/or foldable storage section. A fastening member, such as at least one zipper, hook and loop, buttons, snaps, or other fasteners may secure each storage section while providing easy access to any stored items. The fishing equipment may contain a one handle and/or shoulder strap coupled on or near the main storage compartment. Additionally, the main storage compartment may accommodate fishing equipment such as bait trays and folding storage compartments. The folding storage compartments may be removable from the inside of the main storage compartment.

In certain examples, the fishing equipment may also have a wall that can unfold to create a relatively level surface while a fisherman carries the equipment. The relatively level surface may have a plurality of uses such as organizing bait to holding an electronic tablet. The foldable wall may allow a user to access the content of at least one storage section in an organized fashion along a flat surface. Additionally, the foldable wall may also contract, allowing a user to secure and safely carry items inside a bag.

While this disclosure has been particularly shown and described with reference to preferred embodiments, it will be understood by those skilled in the art that various changes in form and detail may be made therein without departing from the spirit and scope of the invention. The inventors expect skilled artisans to employ such variations as appropriate, and the inventors intend the invention to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically, and by way of example, although the headings refer to a "Technical Field," the claims should not be limited by the language chosen under this heading to describe the so-called field. Further, a description of a technology as background information is not to be construed as an admission that certain technology is prior art to any embodiment(s) in this disclosure. Neither is the "Brief Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

I claim:
1. A storage apparatus comprising:
a main storage compartment defined by a front wall, a rear wall, a first side wall, a second side wall, and a bottom wall, with each of said walls being of a cloth like material;
a top portion that is coupled to one or more of the said walls and capable of covering an opening defined by the main storage compartment, wherein the top portion has at least one securing mechanism to couple to a counterpart securing mechanism found on the outer side of the wall opposing the wall that the top portion is coupled to;
at least one folding storage compartment having a front section, a first side section, a second side section, a rear section, a bottom section, and a top section; and
wherein said folding storage compartment is sized and shaped to be housed within a portion of the main storage compartment and be coupled to an internal side of one of said walls of the main storage compartment and the at least one folding storage compartment is folded in and out of the main storage compartment.

2. The at least one folding storage compartment of claim 1, further comprising a folding section fastener, wherein the folding section fastener is configured to secure items within the at least one folding storage compartment.

3. The storage apparatus of claim 1, further comprising a first side storage section and a second side storage section, wherein the first side storage section is attached to the first side wall and the second side storage section is attached to the second side wall.

4. The storage apparatus of claim 1, further comprising a front storage section, wherein the front storage section is attached to the front wall.

5. The storage apparatus of claim 1, further comprising at least one shoulder strap, wherein the at least one shoulder strap attaches to the storage apparatus via an at least one shoulder strap fastener.

6. The storage apparatus of claim 1, further comprising at least one top cover fastener and at least one webbing loop fastener, wherein the top cover fastener is attached to the removably coupled top, wherein the at least one webbing loop fastener is attached to one of said walls, wherein the top cover fastener is configured to secure the removably coupled top by fastening to the at least one webbing loop fastener.

7. The storage apparatus of claim 1, further comprising at least one storage pouch, wherein the at least one storage pouch is attached to one of the said walls.

8. A storage system comprising:
at least one storage tray having a top section, a bottom section, and a securing mechanism to removably coupled the top section and bottom section together; and
a storage apparatus configured to carry the at least one storage tray, wherein the storage apparatus further comprises a main storage compartment defined by a front wall, a rear wall, a first side wall, a second side wall, and a bottom wall, with each of said walls being of a cloth like material;
a top portion that is coupled to one or more of the said walls and capable of covering an opening defined by the main storage compartment, wherein the top portion has at least one securing mechanism to couple to a counterpart securing mechanism found on the outer side of the wall opposing the wall that the top portion is coupled to;
at least one folding storage compartment having a front section, a first side section, a second side section, a rear section, a bottom section, and a top section; and
wherein said folding storage compartment is sized and shaped to be housed within a portion of the main storage compartment and be coupled to an internal side of one of said walls of the main storage compartment and the at least one folding storage compartment is folded in and out of the main storage compartment.

* * * * *